United States Patent [19]
Pinnavaia et al.

[11] Patent Number: 5,853,886
[45] Date of Patent: Dec. 29, 1998

[54] HYBRID NANOCOMPOSITES COMPRISING LAYERED INORGANIC MATERIAL AND METHODS OF PREPARATION

[75] Inventors: Thomas J. Pinnavaia; Tie Lan, both of East Lansing, Mich.

[73] Assignee: Claytec, Inc., East Lansing, Mich.

[21] Appl. No.: 665,518

[22] Filed: Jun. 17, 1996

[51] Int. Cl.$^6$ ............................. B32B 5/16; C08K 9/00
[52] U.S. Cl. .................. 428/403; 428/404; 428/407; 428/699; 523/209; 523/216; 525/445; 525/447; 525/449
[58] Field of Search ................. 428/403, 407, 428/688, 699, 404; 525/445, 447, 449; 523/209, 210, 216

[56] References Cited

U.S. PATENT DOCUMENTS

| | | | |
|---|---|---|---|
| 3,432,370 | 3/1969 | Bash | 149/19.6 |
| 3,511,725 | 5/1970 | Stevens et al. | 149/19.6 |
| 3,847,726 | 11/1974 | Becker et al. | 428/416 |
| 4,376,729 | 3/1983 | Johnson et al. | 252/1 |
| 4,889,885 | 12/1989 | Usuki | 524/445 |
| 5,032,546 | 7/1991 | Giannelis et al. | 501/3 |
| 5,202,295 | 4/1993 | McCauley | 502/65 |
| 5,527,871 | 6/1996 | Tani et al. | 528/10 |
| 5,552,469 | 9/1996 | Beall et al. | 524/445 |
| 5,698,624 | 12/1997 | Beall et al. | 524/445 |
| 5,726,113 | 3/1998 | Pinnavaia et al. | 502/62 |
| 5,747,560 | 5/1998 | Christiani et al. | 523/209 |
| 5,760,106 | 6/1998 | Pinnavaia et al. | 523/209 |
| 5,760,121 | 6/1998 | Beall et al. | 524/450 |

FOREIGN PATENT DOCUMENTS

| | | |
|---|---|---|
| 1004859 | 2/1977 | Canada . |
| 9304117 | 3/1993 | WIPO . |
| 9304118 | 3/1993 | WIPO . |

OTHER PUBLICATIONS

Giannelis, E.P. JOM 44 28 (1992).
Gleiter, H. Adv. Mater 4 474 (1992).
Novak, B. M., Adv. Mater. 5 422 (1993).
Pinnavaia, T.J. Science 220 365 (1983).
Kato, C., et al., Clays Clay Miner 27 129 (1979).
Sugahara, Y., et al., J. Ceram. Soc. Jpn. 100 413 (1992).
Vaia, R.A., et al., Chem Mater. 5 1694 (1993).
Messersmith, P.B., et al., Chem. Mater. 5 1064 (1993).
Fukushima, Y., et al., J. Inclusion Phenom. 5 473 (1987).
Fukushima, Y., et al., Clay Miner. 23 27 (1988).
Usuki, A., et al., J. Mater. Res. 8 1179 (1993).
Kojima, Y., et al., J. Mater. Res. 8 1185 (1993).
Lan, T. and Pinnavaia, T. J., Chem. Mater. 6 2216 (1994).
Vaia et al 7 154 (1995) (Advanced materials).

*Primary Examiner*—H. Thi Le
*Attorney, Agent, or Firm*—Ian C. McLeod

[57] ABSTRACT

The present invention relates to particulate concentrate compositions formed by intercalation of a polymer polymerizing component into the galleries of a layered inorganic cation exchange composition initially in proton exchanged form and to the use of the particulate concentrates for the preparation of cured polymer-inorganic nanolayer hybrid composite compositions. The polymer polymerizing component comprising the particulate concentrate contains a basic group for reaction with the protons of the inorganic cation exchanger. Also, the polymer polymerizing component contains a functional group for polymerization reaction with a polymer precursor, a mixture of polymer precursors, or a polymer melt which is introduced into the galleries of the inorganic cation exchanger and reacts with the polymer polymerizing component to form a cured polymer-inorganic nanolayer hybrid composite. In the most preferred embodiment of the invention the layered inorganic composition is selected from the family of 2:1 layered silicate cation exchangers.

22 Claims, 3 Drawing Sheets

Disordered nanocomposite, containing exfoliated silicate nanolayers

Ordered nanocomposite, nanolayers equally spaced by intercalated polymer matrix.

Disordered nanocomposite, containing exfoliated silicate nanolayers

HYBRID NANOCOMPOSITES COMPRISING LAYERED INORGANIC MATERIAL AND METHODS OF PREPARATION

BACKGROUND OF THE INVENTION

1. Field of the Invention

The present invention relates to particulate concentrate compositions formed by intercalation of a polymer polymerizing component into the galleries of a layered inorganic cation exchange composition initially in proton exchanged form and to the use of the particulate concentrates for the preparation of cured polymer-inorganic nanolayer hybrid composite compositions. In the most preferred embodiment of the invention the layered inorganic composition is selected from the family of 2:1 layered silicate cation exchangers.

2. Description of the Related Art

Organic-inorganic hybrid composites can exhibit mechanical properties superior to those of their separate components. To optimize the performance properties of these materials, it is usually desirable to disperse the inorganic components in the organic matrix on a nanometer length scale (Giannelis, E. P. JOM 44 28 (1992); Gleiter, H. Adv. Mater. 4 474 (1992); and Novak, B. M., Adv. Mater. 5 422 (1993)). Smectite clays and other layered inorganic materials that can be broken down into nanoscale building blocks (Pinnavaia, T. J. Science 220 365 (1983)) are useful for the preparation of organic-inorganic nanocomposites.

U.S. Pat. Nos. 3,432,370 to Bash et al; 3,511,725 to Stevens et al, 3,847,726 to Becker et al and Canadian Patent No. 1,004,859 to Nelson show various compositions incorporating flexible epoxy resins. There are numerous uses for these polymer matrices.

Smectite clays are natural or synthetic layered aluminosilicate such as montmorillonite, bentonite, hectorite, fluorohectorite, saponite, beidellite, nontronite, and related analogs. Smectite clays have layered lattice structures in which the tactoids (crystallites) consist of stacked two-dimensional oxyanions separated by layers of hydrated cations. The oxygen atoms define layers approximately 10 Å-thick, containing two sheets of tetrahedral sites and a central sheet of octahedral sites. The 2:1 relation between the tetrahedral and the octahedral sheets in a layer defines 2:1 layered silicates. For a typical 2:1 layered silicate, such as montmorillonite, the layer is made up of a central octahedral sheet, usually occupied by aluminum or magnesium, sandwiched between two sheets of tetrahedral silicon sites. Various isomorphous cation substitutions, e.g., $Si^{4+}$ by $Al^{3+}$ in the tetrahedral sheet, or $Al^{3+}$ by $Mg^{2+}$, or $Mg^{2+}$ by $Li^+$ in the octahedral sheet, among others, also result in negatively charged nanolayers. These negatively charged layers are approximately 10 Å-thick, and are separated by hydrated cations such as alkali or alkaline earth metal ions in the gallery (interlayer) regions between the 2:1 layered silicates. The negative charge on the layer is balanced by interlayer or "gallery" cations, normally $Ca^{2+}$ and $Na^+$. The gallery cations in a natural smectite can be replaced by simple ion exchange process with almost any desired cation, including alkylammonium alkyl phosphonium and other organic cations. Some idealized unit cell compositions and layer charge densities of smectite clays are listed in Table 1.

TABLE 1

Ideal Structural Formulas for some 2:1 Layered Silicates.

| Mineral Name | Ideal Formula | Layer Charge Density per $O_{20}$ unit |
|---|---|---|
| Hectorite | $M_{x/n}^{n+} \cdot yH_2O[Al_{6.0-x}Mg_x](Si_{8.0})O_2(OH)_4$ | 0.4–1.2 |
| Fluoro-hectorite | $M_{x/n}^{n+} \cdot yH_2O[Al_{6.0-x}Mg_x](Si_{8.0})O_{20}(OH, F)_4$ | 0.4–1.2 |
| Montmorillonite | $M_{x/n}^{n+} \cdot yH_2O[Mg_{6.0-x}Li_x](Si_{8.0})O_{20}(OH)_4$ | 0.6–1.0 |
| Nontronite | $M_{x/n}^{n+} \cdot yH_2O[Fe_{4.0}](Si_{8.0-x}Al_x)O_{20}(OH)_4$ | 0.6–1.0 |
| Beidellite | $M_{x/n}^{n+} \cdot yH_2O[Al_{4.0}](Si_{8.0-x}Al_x)O_{20}(OH)_4$ | 0.8–1.0 |
| Saponite | $M_{x/n}^{n+} \cdot yH_2O[Mg_{6.0}](Si_{8.0-x}Al_x)O_{20}(OH)_4$ | 0.6–1.2 |
| Vermiculite | $Mg_{(x-z)/2}^{2+}[Mg_{6-z}Fe^{III}_z](Si_{8-x}Al_x)O_{20}(OH)_4$ | 1.2–1.4 |
| Muscovite mica | $K_2[Al_{4.0}(Si6.0}Al_{2.0})O_{20}(OH)_4$ | 2.0 |
| Biotite mica | $K_2[Al_yMg_{6+(x/2)-(3y-2)}](Si_{6.0-x}Al_{2.0+x})O_{20}(OH)_4$ (x < 1, y < 2) | 2.0 |
| Phlogopite mica | $K_2[Mg_{6.0}(Si6.0}Al_{2.0})O_{20}(OH)_4$ | 2.0 |

Included in Table 1 for comparison purpose are the idealized compositions of 2:1 layered silicates, smectite clays, vermiculite, muscovite mica, biotite mica, and phlogopite mica. Vermiculite has a layer charge density higher than a smectite but lower than a mica. Micas usually have layer charge of 2.0. The gallery cations in a vermiculite or a mica can also be replaced by ion exchange, but the exchange processes are generally slower than for smectite clays. Also, vermiculites and micas exist commonly as single crystals that range in size from 10 μm to 10 cm or larger. In contrast, smectite clays have sub-micron particle sizes. The particle size of vermiculite and mica can be reduced to the micron size range by mechanical grinding. Other ion exchangeable 2:1 layered silicate including illite, rectorite and synthetic derivative such as tetrasilicic mica and synthetic mica montmorillonite (SMM).

Those skilled in the art will know that smectites are members of a more universal class of layered inorganic ion exchangers. Many other layered inorganic cation exchanger materials can be selected in place of smectites. These layered materials include crystalline sheet silicate, layered phosphates, arsenates, sulfates, titanates and niobates.

The crystalline sheet silicates include kenyaite: $Na_2Si_{20}O_{41} \cdot xH_2O$, x=10; magadite: $Na_2Si_{20}O_{41} \cdot xH_2O$, x=3; makatite: $Na_2Si_4O_9 \cdot xH_2H$, x=3; kanemite: $NaHSi_2O_5 \cdot xH_2O$, x=3, revdite: $Na_2Si_2O_5 \cdot 5H_2O$; Grumantite: $NaHSi_2O_5 \cdot xH_2O$, x=0.9, and Ilerite $Na_2Si_8O_{17}$.

The layered phosphates, arsenates, titanates and niobates are listed as follows:

TABLE 2

| Class | Compound general formula |
|---|---|
| Phosphates | $H_2\{M^{IV}(PO_4)_2\} \cdot xH_2O$, ($M^{IV}$=Zr, Ti, Ge, Sn, Pb) $CaPO_4R \cdot H_2O$ (R = $CH_3$, $C_2H_5$), $VOPO_4 \cdot 2H_2O$, $NbOPO_4 \cdot 3H_2O$, $H\{SnCl(OH)PO_4\} \cdot 2H_2O$ |
| Arsenates | $H_2\{M^{IV}(As_4)_2\} \cdot xH_2O$, $H\{MnAsO_4\} \cdot H_2O$ (krautite), $H\{SnCl(OH)AsO_4\} \cdot 2H_2O$ |
| Titanates | $Na_2Ti_3O_7$, $K_2Ti_4O_9$, $Na_4Ti_9O_{20} \cdot xH_2O$, $K_2Ln_2Ti_3O_{10} \cdot H_2O$ |
| Vanadates | $KV_3O_8$ |

TABLE 2-continued

| Class | Compound general formula |
| --- | --- |
| Niobates | $KTINbO_5$, $CSTi_2NbO_7$, $A_3Ti_5NbO_{14}$, (A = Li, Na, K, Rb, Cs, Tl), $KNb_3O_8$, $K_4Nb_6O_{17}$, $ACa_2Nb_3O_{10}$, (A = K, Rb, Cs) |
| Molybdates | $MoO_3(OH)$, $H_xMoO_3$ |
| Uranyl Compound | $H\{UO_2PO_4\}.4H_2O$, $H\{UO_2AsO_4\}.4H_2O$ |
| Manganates | Busertite |

Most important among the properties of smectite clays is the ability to replace the gallery cations in the pristine clay with almost any desired cations by ion exchange reactions. The exchange cations are very important in determining the ability of the gallery regions to imbibe (intercalate) neutral molecules. Inorganic cations ($M^{n+}$) such as ($Na^+$, $Ca^{2+}$ and the like) prefer to be solvated by polar molecules such as water and certain polar organic molecules. Thus, these exchange forms are readily swollen by polar molecules, especially by water. Organic cations (alkylammonium, phosphonium ions and the like) are less hydrophilic, even hydrophobic, and prefer to intercalate organic molecules into the gallery regions. Inorganic cations such as $K^+$ and $Mg^{2+}$ in mica are anhydrous and strongly bound to the intergallery surfaces. Therefore, these silicates are difficult for gallery swelling and ion exchange reaction. However, the exchange of gallery cations in micas can be facilitated by reducing the particle size of the particles, preferably to average values of 2 $\mu$m or less.

Clay-organic intercalates are intercalation compounds in which organic molecules enter the clay galleries and form definite compositions with specific clay basal spacings. The organic compounds that have been reported to form clay intercalates include uncharged polar organic compounds and positively charged organic compounds. These two classes of guest species are intercalated by ion exchange, physical adsorption, or other mechanisms. Intercalation of organic polymers in clay minerals has been recognized to occur as natural processes in soils. Polymer adsorption and desorption also occurs under synthetic conditions (Theng, B. K. G. "The Chemistry of Clay-Organic Reactions", John Wiley & Sons, pages 136 to 206 (1974)). Interaction between clays and polymeric species have been discussed as natural or synthetic polymer adsorption and desorption (Theng, B. K. G. "Formation and Properties of Clay-Polymer Complexes", Elsevier pages 63 to 133 (1979)).

In general, the polymer-clay composites can be divided into three categories: conventional composites, intercalated nanocomposites, and exfoliated nanocomposites. In a conventional composite, the clay tactoids exist in their original state of aggregated layers with no intercalation of the polymer matrix between the layers of the clay. The polymer contacts the external surfaces of the clay particles (tactoids) exclusively. In an intercalated nanocomposite the insertion of polymer into the clay layer structure occurs in a crystallographically regular fashion, regardless of the clay-to-polymer ratio. An intercalated nanocomposite normally is interlayered by only a few molecular layers of polymer and the properties of the composite typically resemble those of the ceramic host (Kato, C., et al., Clays Clay Miner. 27 129 (1979); Sugahara, Y., et al., J. Ceram. Soc. Jpn. 100 413 (1992); Vaia, R. A., et al., Chem. Mater. 5 1694 (1993); and Messersmith, P. B., et al., Chem. Mater. 5 1064 (1993)). In contrast, in an exfoliated nanocomposite, the individual 10-Å-thick clay layers are separated in a continuous polymer matrix by average distances that depend on loading. Usually, the clay content of an exfoliated clay composite is much lower than that of an intercalated nanocomposite. Consequently, an exfoliated nanocomposite has a monolithic structure with properties related primarily to those of the starting polymer.

The exfoliation of smectite clays provides 10 Å-thick silicate layers with high in-plane bond strength and aspect ratios comparable to those found for fiber-reinforced polymer composites. Exfoliated clay nanocomposites formed between organocation exchanged montmorillonites and thermoplastic nylon-6 have recently been described (Fukushima, Y., et al., J. Inclusion Phenom. 5 473 (1987); Fukushima, Y., et al., Clay Miner. 23 27 (1988); and Usuki, A., et al., J. Mater. Res. 8 1179 (1993); and WO 93/04117 and 93/04118 describing thermoplastic polymers). Clay exfoliation in the nylon-6 matrix gave rise to greatly improved mechanical, thermal, and Theological properties, making possible new materials applications of this polymer (Usuki, A., et al., J. Mater. Res. 8 1179 (1993); and Kojima, Y., et al., J. Mater. Res. 8 1185 (1993)). Recently clay-reinforced epoxy nanocomposites have been reported (Lan, T. and Pinnavaia, T. J., Chem. Mater. 6 2216 (1994)) by using alkylammonium exchanged smectite clays in a flexible epoxy matrix. The reinforcement of the exfoliated 10-Å-thick clay layers was very significant. For instance, 15 wt % of the $CH_3(CH_2)_{17}NH_3^+$-montmorillonite in the epoxy matrix increased the tensile strength 10 times and modulus 8 times. The significant reinforcing benefit provided by the silicate was especially significant for a flexible matrix. U.S. Pat. No. 4,889,885 to Usuki et al shows thermoplastic vinyl polymer composites containing clay.

For all the polymer-clay nanocomposites reported to date, alkylammonium onium ions, or $\alpha,\omega$-amino acid ions were exchanged into the clay galleries prior to nanocomposite formation, in part, to make the galleries more hydrophobic and better suited for interaction of polymer precursors. These organoclays allow intercalation (access) of monomer species (e.g., $\epsilon$-caprolactam, epoxy resin and curing agent) into the clay gallery (Usuki, A., et al., J. Mater. Res. 8 1179 (1993), Lan, T. and Pinnavaia, T. J., Chem. Mater. 6 2216 (1994)). Upon polymerization reaction, the monomers form a network in the clay gallery regions and a polymer-clay nanocomposite is formed. By controlling the intra- and extragallery polymerization rate of the monomers, exfoliated and intercalated nanocomposites can be prepared.

Alkylammonium exchanged clays also have been used to form polymer-clay compositions by direct polymer melt intercalation (Vaia et al. Chem. Mater., 7 154, (1995)). The process involves heating a polymer-silicate mixture either statically or under shear in an extruder above the softening temperature of the polymer.

In the previous art, the presence of long chain alkyl onium ions in the clay galleries was essential for allowing the monomer or the pre-formed polymer to migrate into the clay gallery. However, the alkylammonium ions in the gallery can block potentially favorable van der Waals interactions of the polymer matrix with the clay gallery surfaces. Also, the high cost of the alkylammonium ions and complex processing procedures limit the applications of the composites. Furthermore, the alkylammonium ions are toxic and require special handling procedures. Thus, eliminating the need for alkylammonium exchange cations in forming polymer-inorganic nanolayer composites would be a great practical and economical benefit.

Another problem restricting the use and performance properties of polymer-inorganic nanolayer hybrid composites is the difficulty in forming the composites with the inorganic nanolayers in the preferred exfoliated state. The prior art teaches two general ways of achieving inorganic nanolayer exfoliation in a polymer matrix. One approach is to form the polymer from monomeric polymer precursors or mixtures of polymer precursors in the presence of a layered inorganic ion exchanger interlayered by organic onium ions. However, in many cases the polymerization rate for polymer formation is much slower in the interlayer gallery region of the layered inorganic phase than in the bulk polymer. Consequently, intercalated rather than exfoliated hybrid nanocomposites are formed. Also, this "in situ" polymerization strategy lacks manufacturing versatility in the production of parts with hybrid nanocomposite compositions, because the nanocomposites can only be produced in batches of fixed polymer to inorganic nanolayer ratio.

The second approach to nanocomposite formation mixes a pre-formed thermoplastic polymer with the layered inorganic ion exchanger, typically modified with alkylammonium exchange ions. Melt processing the mixture under applied sheer in an extruder can lead to nanocomposite formation under suitable circumstances. But melt processing is limited to thermoplastics with melting temperatures below the decomposition temperature of the onium exchange cation.

In view of the above limitations of the prior art, more versatile processing compositions and processing methods applicable to both thermoset and thermoplastic polymers are needed in order to more efficiently manufacture a broader range of polymer-inorganic nanolayer hybrid composite compositions.

SUMMARY OF THE INVENTION

The present invention provides in part for a particulate concentrate composition useful for forming cured polymer-inorganic nanolayer hybrid composite compositions. The cured polymer composites can be thermosets or thermoplastics. A broad class of layered cation exchange compositions may be utilized as inorganic nanolayers. In the preferred embodiment of the invention a member of the 2:1 layered silicate family of ion exchangers is selected for the formulation of the particulate concentrate composition. Less preferred layered inorganic cation exchanger compositions, including crystalline layered sheet silicates, phosphates, arsenates, titanates, vanadates, riobates, molybdates, manganates and uranyl compounds may be selected.

The particulate concentrate compositions are formed by intercalation of a polymer polymerizing component into the galleries of proton exchanged form of the layered inorganic composition. A polymer polymerizing component can be defined as any reagent containing a functional group capable of polymerization reaction with a polymer precursor or a mixture of polymer precursors. For the purposes of the present invention the polymer polymerizing agent also contains a basic functional group for reaction with the gallery protons of the inorganic ion exchanger. The basic and polymerizable functional groups on the polymer polymerizing agent may be identical or different in chemical structure.

Reaction of the intercalated particulate concentrate with a polymer precursor or mixture of polymer precursors affords a cured polymer-nanolayer hybrid composite with mechanical performance properties greatly superior to the pristine cured composite. The absence of alkylammonium ions on the exchange sites of the inorganic nanolayers optimizes interfacial infractions and enhances the mechanical strength of the polymer phase. In addition, the cured polymer-nanolayer composites exhibit improved resistance to permeation by gases and to swelling by organic solvents. These latter properties improve the performance of the composites as engineering materials and as barrier films, sealants and the like. Also, the integrity of the composites is improved by the absence of the alkylammonium ions, thus improving the dimensional stability of the composites in the presence of solvents and the resistance of the composite to crazing and cracking. Furthermore, the adhesive strengths of the elastomeric nanocomposites embodied in this invention is improved by the absence of alkylammonium ions.

The present invention relates to a particulate composition used to prepare a cured polymer and layered inorganic composition composite which comprises:

a polymer polymerizing component intercalated into the particles of a layered inorganic composition with nanolayers and with galleries between the nanolayers wherein:

(1) the layered inorganic composition has cation exchange sites occupied by protons; and (2) the polymer polymerizing component contains at least one basic group for reaction with the protons of the layered inorganic composition, wherein in use of the particulate composition the nanolayers are separated by a polymer precursor or polymer melt which is introduced into the galleries of the inorganic layered composition and reacts with the polymer polymerizing component and wherein the weight ratio of the polymer polymerizing component to layered inorganic composition is between about 1:100 and 100:1.

The present invention also relates to a particulate composition used to prepare a cured polymer and 2:1 layered silicate hybrid composite which comprises:

a polymer polymerizing component intercalated into particles of a 2:1 layered silicate with nanolayers and with galleries between the nanolayers wherein:

(i) the 2:1 layered silicate has cation exchange sites occupied by protons; and (ii) the polymer polymerizing component for the polymer precursor contains at least one basic group for reaction with the protons of the layered silicate, wherein in use of the particulate composition the nanolayers are separated by a polymer precursor which is introduced into the galleries of the 2:1 layered silicate wherein the weight ratio of the polymer polymerizing component to the 2:1 layered silicate is in the range 1:100 to 100:1.

The present invention further relates to a hybrid organic-inorganic composite material containing a cured polymer and particles of a layered inorganic composition having galleries between the layers, the galleries containing the cured polymer, wherein the layered inorganic composition has cation exchange sites which are protonated prior to curing of the polymer, wherein the ratio by weight of cured polymer to the layered inorganic composition is between about 200:1 and 1:100, wherein an average separation between the layers corresponds to a height of the galleries of about 0.4 to 300 nm and wherein the particles have an average diameter of between about 20 and 20,000 nm and a ratio of length to width of the particles in a range between about 20,000:1 and 20 to 1.

The present invention also relates to a hybrid organic-inorganic composite material containing a cured polymer and particles of a layered 2:1 layered silicate particles having galleries between the layers, the galleries containing the cured polymer, wherein the silicate has cation exchange sites which are protonated prior to curing of the polymer, with the proton bonded to the polymer, wherein the ratio by weight of cured polymer to layered silicate is between about 200:1 and 1:100, wherein an average separation between the layers corresponds to a height of the galleries of about 0.4 to 300 nm and wherein the particles have an average diameter of between about 20 and 20,000 nm and a ratio of length to width of the particles in a range between about 20,000:1 and 20 to 1.

The present invention also relates to a method for the preparation of a curable composition which comprises:

(a) providing a layered inorganic composition and with nanolayers and galleries between the nanolayers and with proton cation exchanged sites; and (b) intercalating a polymer polymerizing component into the galleries of the layered inorganic composition, wherein (i) the polymer polymerizing component contains at least one basic group for reaction with the protons of the layered inorganic composition;

(ii) the nanolayers are separated by the polymer polymerizing component in the galleries;

(iii) the weight ratio of the polymer polymerizing component to the layered inorganic composition is between about 1:100 to 100:1; and (iv) wherein the composition can be mixed with a polymer precursor and cured to form a cured polymer; and wherein the composition can be mixed with a polymer precursor and cured to form a cured polymer.

The present invention also relates to a method for the preparation of a curable composition which comprises:

(a) providing a 2:1 layered silicate with nanolayers and galleries between the nanolayers with proton cation exchanged sites; and (b) intercalating a polymer polymerizing component into the galleries of the 2:1 layered silicate, wherein (i) the polymer polymerizing component contains at least one basic group for reaction with the protons of the silicate;

(ii) the nanolayers are separated by the polymer polymerizing component in the galleries; and (iii) the weight ratio of the polymer polymerizing component to the layered silicate is between about 1:100 to 100:1, and wherein the composition can be mixed with a polymer precursor and cured to form a cured polymer.

The present invention also relates to a method for the preparation of a cured polymer composite prepared from a curable composition comprising a polymer polymerizing component and a layered inorganic component with nanolayers and galleries between the monolayers wherein:

(i) the layered inorganic composition has cation exchange sites occupied by protons;

(ii) a polymer precursor or polymer melt which contains at least one basic group for reaction with protons of the layered inorganic composition;

(iii) the nanolayers are separated by the polymer polymerizing component in the galleries; and (iv) the weight ratio of the polymer polymerizing component to the layered inorganic composition between about 1:100 to 100:1, which comprises:

(a) providing in a mixture the curable composition with a polymer precursor; and (b) curing the mixture at a temperature and for a time to produce the cured composition, wherein the galleries contain the cured polymer composite.

The present invention further relates to a method for the preparation of a cured thermoset polymer composite prepared from a curable composition comprising a thermoset polymer polymerizing component and a 2:1 layered silicate with nanolayers and galleries between the monolayers wherein:

(i) the 2:1 layered silicate has cation exchange sites occupied by protons;

(ii) a polymer precursor or polymer melt which contains at least one basic group for reaction with protons of the silicate;

(iii) the nanolayers are separated by the polymer precursor in the galleries; and (iv) the weight ratio of the polymer precursor to the layered silicate is between about 1:100 to 100:1, which comprises:

(a) providing in a mixture the curable composition with a polymer precursor; and (b) curing the mixture at a temperature and for a time to produce the cured composition, wherein the galleries contain the cured polymer composite.

BRIEF DESCRIPTION OF THE FIGURES

FIG. 1 is a flow diagram showing a schematic representation of a hybrid nanocomposite prepared from a particulate concentrate comprising an epoxy curing agent as the polymer polymerizing component and the proton exchanged form of a smectite clay. Different states of the 2:1 layered silicate are illustrated, namely, (Step A) the pristine inorganic state, and (Step B) the proton exchanged form, (Step C) an epoxy curing agent-intercalated layered silicate particulate concentrate, and (Step D) the cured epoxy polymer-exfoliated nanolayer hybrid composite prepared from the curing agent-intercalated silicate concentrate by reaction with a mixture of epoxy resin and additional curing agent as the polymer precursor.

OBJECTS

The first object of the present invention is to provide for a particulate concentrate composition consisting of a polymer polymerizing component and an inorganic cation exchange composition in fully or partially proton exchanged form, that can subsequently be mixed with a polymer precursor, a mixture of polymer precursors or a polymer melt (that is a cured thermoplastic polymer under melt processing conditions) to form cured polymer-inorganic nanolayer hybrid composites with improved mechanical performance properties relative to the unreinforced cured polymer. More specially, the invention relates to polymer polymerizing components that contain a basic group (e.g., amine, and amide) for reaction with protons on the gallery exchange sites of the inorganic cation exchanger and a functional group for coupling, crosslinking, entanglement or polymerization reaction with the polymer precursor, mixture of polymer precursors or polymer melt.

The second object of the present invention is to provide for hybrid nanocomposite compositions of a cured polymer matrix and inorganic nanolayers, wherein the clay nanolayers function as reinforcement agents and as barriers to permeants, thus improving the strength, dimensional stability and solvent resistance and wherein the initial exchange cations on the inorganic nanolayers are primarily protons.

The third objective of the present invention is to provide low cost, high-speed, environmentally benign methods for producing the particulate concentrate compositions and the cured polymer-inorganic nanolayer hybrid composites.

DESCRIPTION OF PREFERRED EMBODIMENTS

There are many families of layered inorganic cation exchange compositions that are suitable for providing the objects of the present invention. Among the various families described in Tables 1 and 2, the smectite clays are preferred owing to their low cost and availability as natural or synthetic minerals.

Figures 1B, 1C:
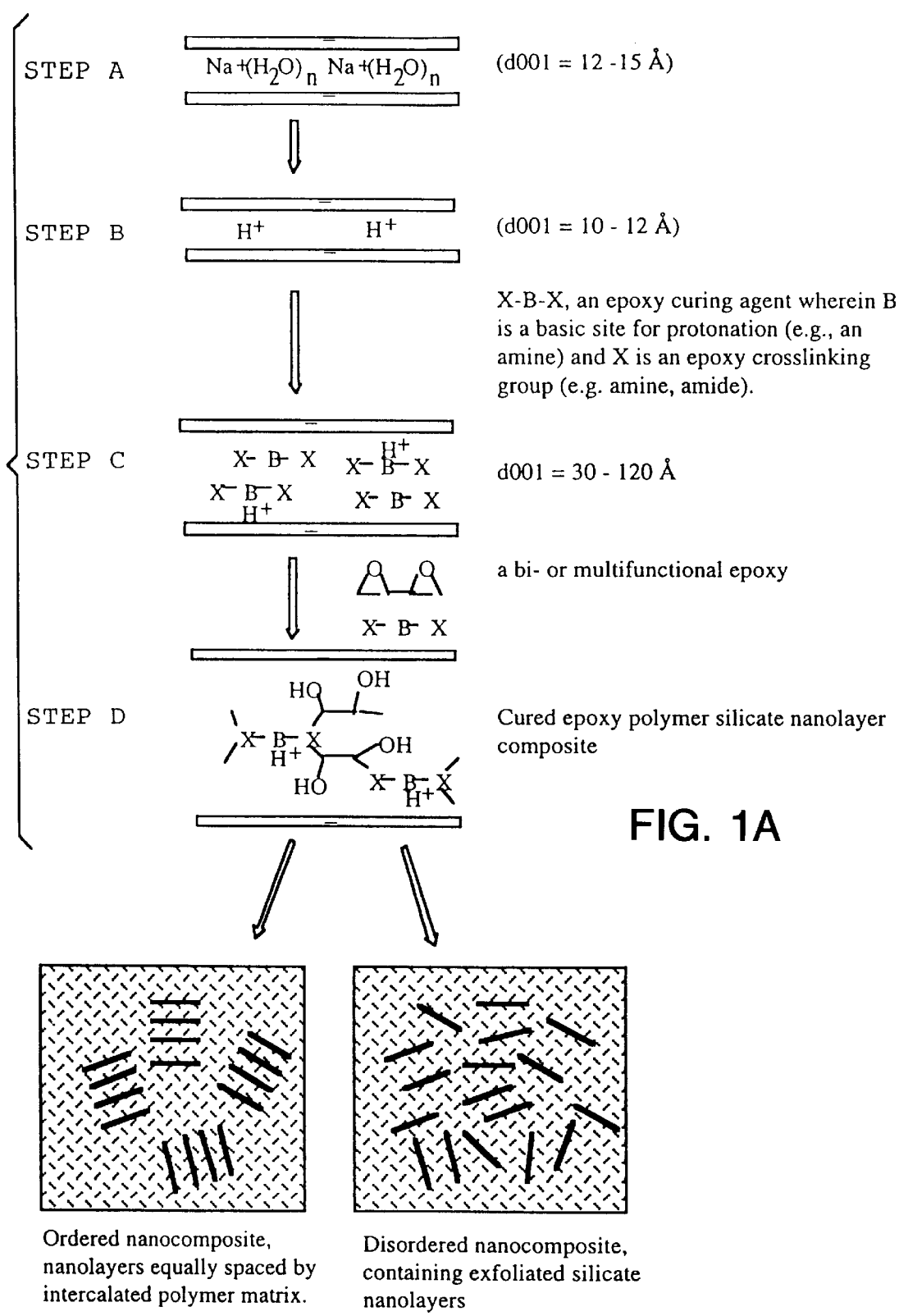
FIGS. 1B and 1C are schematic representations of nanocomposite products showing ordered and disordered products.

FIG. 1 Step A illustrates a typical natural smectite clay wherein inorganic exchangeable cation, such as $Na^+$ or $Ca^{2+}$ and coordinated water molecules occupy the interlayer galleries. The other 2:1 layered silicate compositions described in Table 1 possess an analogous structure with exchangeable cations located between the layers that are approximately 1 nm thick. These pristine 2:1 layered silicates are hydrophilic and the galleries generally are not accessible for intercalation of hydrophobic organic monomers and polymers. The pristine silicates normally have a basal spacing in the range of 1.0 to 1.5 nm under ambient condition, depending on the degree of gallery hydration. Cations in the 2:1 layered silicate galleries can be replaced by ion exchange by other positive charged species. Of particular value for the purposes of the art disclosed here are 2:1 layered silicates in which the exchange cations have been replaced by protons.

Proton exchanged 2:1 layered silicates are prepared by simple ion-exchange reaction or by thermal conversion of the ammonium exchanged forms of the minerals. Proton exchanged smectite clays and related 2:1 layered silicates typically have basal spacings between 1.0 and 1.5 nm, (FIG. 1 Step B) depending in part on the degree of gallery hydration.

Many polymer polymerizing components contain basic groups. For instance, amines are a widely used class of polymer polymerizing components acting especially as "curing agents" for epoxy resins. The acidic protons in the layered silicate galleries are readily combined with basic groups on this class of polymer polymerizing component. Once the amine is adsorbed by the protonated exchange form of the clay, the average separation between the layers increases from 5 Å to 120 Å or beyond, depending on the amount and the size of the adsorbed component. FIG. 1 Step C illustrates the structural features of the curing agent-intercalated silicate concentrate.

The curing agent-intercalated silicate concentrate can react with a mixture of epoxy resin and additional curing agent in stoichiometric amount to form a cured epoxy-nanolayer hybrid composite. In FIG. 1 Step D, the intercalated curing agent of the concentrate, together with additional curing agent react with the polymer resins to form a cross-linked network in the clay galleries. Ideally, for the preparation of the final hybrid nanocomposite the polymer precursor and the curing agent are mixed in stoichiometric or nearly stoichiometric amounts so that all or nearly all of the polymer precursor has been cross-linked by reaction with the functional groups on the curing agent. The proton acidity of the clay helps in catalyzing the intragallery cross-linking polymerization reaction. In the final hybrid nanocomposite the protons are bound to the basic atoms that are a part of the cross-linked polymer network. In another words, the cured polymer is protonated only to the extent necessary to balance the silicate layer charge.

In illustrating the utility of proton exchanged clays for forming layered particulate concentrates and the use of the concentrates in forming cured polymer-inorganic nanolayer hybrid composite compositions, we provide below additional descriptions of a cured polymer system, wherein the curing agent is an amine and the resin is an epoxide. However, the invention of polymer polymerizing component-particulate concentrates and the cured polymer-inorganic nanolayer hybrid composites formed from the concentrates is not limited to epoxys only or to 2:1 layered silicates only. The invention is generalized and applied to other thermoset polymer systems, such as polyurethane, polyurea, polysiloxane and alkyds, where polymer curing involves coupling or crosslinking reactions. Also, any of the protonated forms of the layered inorganic cation exchange compositions identified in Table 2 can be used in place of a protonated 2:1 layered silicate.

Further, those skilled in the art of hybrid nanocomposites will know that the disclosed technology also applies to thermoplastic polymer system. For instance, those skilled in the art will know that if the amine groups of an epoxy curing agent lead only to linear chain formation, the cured epoxy matrix will be thermoplastic. For example, the monoamines, and di-secondary amines shown below will form thermoplastic epoxy polymers:

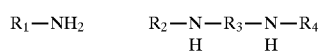

The same principle of formulating and using a polymer polymerizing compound-layered inorganic intercalate concentrate for cured polymer-inorganic nanolayer hybrid formation applies to thermoplastic polymer systems in general. The cured thermoplastic polymer hybrid nanocomposites can be prepared from a suitably protonated polymer polymerizing agent intercalated in a layered inorganic cation exchanger by reaction of the particulate concentrate with an appropriate monomeric reagent. Alternatively, the particulate concentrate may be combined with a polymer melt to form the nanocomposite. In this latter case the process of nanolayer dispersion is equivalent to dispersing the particulate concentrate in a liquid monomer or a mixture of monomer. Coupling of the polymer polymerizing component of the particulate concentrate may occur by reaction with end groups or other reactive centers on the backbone of the molten cured polymer. Alternatively, the protonated polymer polymerizing component and the polymer melt may bind by entanglement. All thermoplastic polymers can benefit from the disclosed technology. The thermoplastic polymers of relevance include polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactons, polylactides, polyimides, and polyolefins (vinyl-containing thermoplastics).

It is important to emphasize that the particulate concentrate compositions can be formed from any polymer-polymerizing component containing a basic center for protonation with the proton-exchanged form of a layered inorganic cation exchange composition. For instance, in the case of an amine-clay concentrate for preparation of a cured epoxy-layered silicate hybrid nanocomposite, the layered particulate concentrate is made by intercalating the inorganic phase with an amino-functional reagent, which is termed a "curing agent" by those skilled in the art, or, more generally for the purpose of the present invention, a "polymer polymerizing component". However, a particulate concentrate composition useful for forming cured epoxy nanocomposites can alternatively be formed by reaction of the epoxy resin with the protonated clay. In this case, the intercalated epoxy resin functions as the polymer polymerizing agent wherein the epoxy oxygen acts as the basic site for protonation. But, in this case care is needed in selecting the processing conditions so that epoxide ring opening and self-polymerization reactions are avoided.

Thus, the concept of forming a layered particulate concentrate for the preparation of thermoset polymer-inorganic nanolayer hybrid composites is a general one and can be applied to many thermoset polymer systems other than epoxies. For instance, silicone elastomers are generally formed by the reaction of siloxane oligomers with silicon alkoxide crosslinking agents. A typical cured polymer system is illustrated as follows:

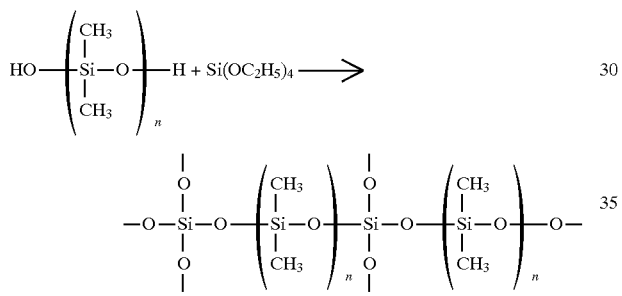

According to the teaching of the present invention, siloxane elastomer-inorganic nanolayer composite can be formed from an intercalated particulate concentrate containing a siloxane polymerizing component and subsequently mixing the concentrate with the necessary amounts of polymer precursor

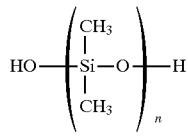

under the conditions necessary for curing the polymer. Examples of suitable siloxane polymer polymerizing component are those containing an amino group for acid-base reaction with the proton form of the layered inorganic phase, such as: $H_2N(CH_2)_3Si(OR)_3$, where R is an alkyl group, or $H_2N(CH_2)_3HN(CH_2)_3Si(OR)_3$, and many others that are readily available on a commercial basis (e.g., see Gelest Inc. Catalog (1996), Tullytown, Pa.).

Furthermore, polyurethane polymers are prepared by reaction of isocyanate and polyols:

-continued

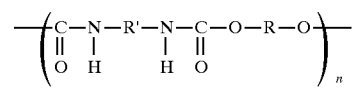

The polyol components (R) usually contains a basic center such as secondary and tertiary amine groups. Therefore, those polyols react readily to the protons in the gallery of the proton exchanged forms of a layered inorganic cation exchange to form polyol-layered particulate concentrates. The concentrates are used to react with appropriate amounts of polyols and isocyanate under conditions necessary to form cured polyurethane-inorganic nanolayer hybrid nanocomposites.

Furthermore, alkyd polymer matrices, formed as illustrated in the following systems are adaptable to the teachings of this invention for formation of hybrid nanocomposites. Glycerol can be intercalated to proton exchanged inorganic cation exchangers, and the resulting concentrates are suitable for nanolayer composite formation.

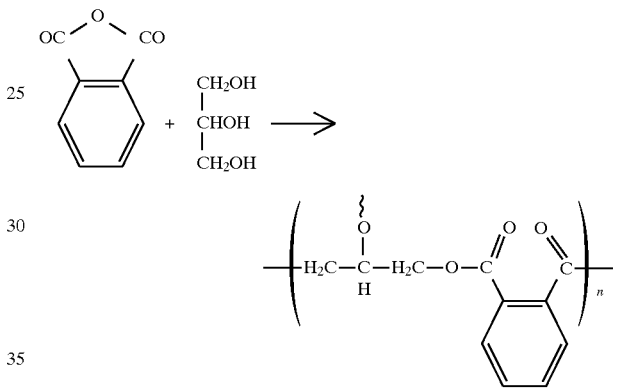

As stated earlier, the present invention relates in part to polymer precursor-2:1 layered silicate intercalate concentrate compositions and methods to prepare them. The silicates mineral should have certain ion exchange properties as in smectite clays, rectorite, vermiculite, illite, micas and their synthetic analogs, including laponite, synthetic mica-montmorillonite and tetrasilicic mica. The silicate layers in the concentrate composition have an average diameter of between about 200 and 20,000 Å and a ratio of length to width of the particles in a range between about 2000 and 20 to 1.

The layered inorganic cation exchange compositions of this invention are converted to proton exchanged forms by any of several possible methods, including direct ion exchange with a mineral acid, ion exchange with the proton exchange form of an ion exchange resin such as Dowex or Amberlite resins, or by thermal decomposition of the ammonium form. Typically at least 10% of the exchange sites are occupied by protons, but more typically all of the silicate exchange sites are protonated. The intercalation of a basic polymer polymerizing component into the protonated solid can be achieved by using solvent and solvent-free processes. In the solvent-based process, the polymer polymerizing component is placed in a solvent that is inert toward polymerization or coupling reaction. For a polyetheramine, for example, the intercalation can be carried out in single or mixed solvent system. Particularly suitable solvents are water or water-ethanol, water-acetone and like water-polar co-solvent systems. Upon removal of the solvent, the intercalated particulate concentrates are obtained. In the solvent-free process, a high shear blender is usually required to conduct the intercalation reaction. The said polymer polymerizing component-particulate intercalate concentrates may be in a suspension, gel, paste or solid forms.

2:1 Layered Silicate Intercalate Concentrates Compositions

In thermoset polymer processing one of the reagents is typically referred to as the curing agent and the epoxide-functional component is call the "resin" precursor. In the formation of epoxy thermoset polymers, for example, the epoxide reagent is typically referred to the resin precursor and the crosslinking agent, typically an amine, is termed the curing agent. When the present invention is applied to an epoxy polymer system, or to a related thermoset polymer matrix, the polymer polymerizing component of the layered particulate concentrate requires (i) a basic center for protonation and (ii) functional crosslinking groups for curing the polymer resin or precursor. Amine groups are preferred basic groups simple because (a) they react with protons, and (b) they also are capable of crosslinking certain resins, (especially epoxy) to form a cured polymer. In addition to a basic amine group for protonation, the polymer polymerizing component can have other functional groups for coupling or crosslinking reactions, for example, an acid anhydride and/or an amide group in the case of curing an epoxy polymer.

The preferred proton exchanged forms of the 2:1 layered silicates embodied by this invention include naturally occurring and synthetic forms of smectites with layer charge densities of 0.4–1.4 $e^-/O_{20}$ unit, such as montmorillonite, hectorite, saponite, nontronite, beidellite, fluorohectorite, and laponite, and mixed layered 2:1 silicates such as rectorite, synthetic mica montmorillonite, and illite and vermiculite and mica-like compositions containing up to 2.0 $e^-/O_{20}$ unit cell such as muscovite, biotite, phlogopite, synthetic mica montmorillonite, taeniolite, and tetrasilicic mica. The silicate layers have a particle size between about 200 and 200,000 Å and a ratio of length to width in a range between about 20,000 to 1 and 20 to 1. The broad range of particle sizes, ion exchange capacities and the low cost of these layered inorganic ion exchangers are highly preferred.

The proton exchanged 2:1 layered silicates can be prepared by several different routes but the following three general methods are most preferred: (1) direct proton exchange with dilute acid (e.g., 0.001N HCl); (2) proton exchange reaction with a protonated form of a cationic ion exchange resins; (e.g., Dowex or Amberlite Resin) and (3), thermal conversion of the ammonium exchanged form of the layered silicate. The fully proton exchanged silicates prepared from the said three methods exhibit identical powder X-ray diffraction patterns, and are equally well suited for forming intercalated polymer polymerizing component-layered particulate concentrates. The layered silicates upon proton exchange retain their platy morphology. Proton exchanged layered silicates are easily dispersed into water. The fully proton exchanged form of a smectite clay (e.g., montmorillonite) when fully hydrated undergoes an increase in basal spacing from ~10 Å (air-dried) to 22 Å. In this hydrated state of the layered silicate, the gallery regions are sufficiently expanded and readily take up guest molecules. The 2:1 layered silicate does not need to be fully proton exchanged for the formation of useful particulate concentrate compositions, but at least 10% of the cation exchange sites of the mineral should be replaced by protons.

Polyetheramines or polyamides used in the present invention as examples of epoxy polymerizing components are soluble in $H_2O$ or in $H_2O$/ethanol mixed solvents. The addition of a polyetheramine or polyamide to a proton-exchanged layered silicate in $H_2O$ or $H_2O$/EtOH suspension results in an acid-base reaction, and the polyetheramine or polyamide guest molecules is readily intercalated in the galleries between the layered silicate nanolayers. A typical polyetheramine such as JEFFAMINE D2000 (Huntsman Chemicals, Houston, Tex.), when intercalated in $H^+$-montmorillonite, gives rise to a basal spacing of 45 Å. In the solvent-free process, the dried protonated clays and the polyetheramine or amide are mixed in a blender (e.g., Waring Commercial Blender) and blended at high speed. The acid-base reaction at the solid-liquid interface results in the intercalation of the polymer precursor into the silicate galleries. By adjusting the weight ratio of the curing agent and the $H^+$-layered silicate, one can control the morphology of the polymer polymerizing component-layered silicate intercalate concentrate to obtain a powder, paste or gel. The weight ratio of amine curing agent to smectite is in the range of 1:100 to 200:1, and more preferably 1:5 to 20:1. The choice of the concentrate in powdered, gel, or liquid suspension form depends on the preferred conditions for processing the cured nanocomposite, particularly on the desired loading of the layered silicate in the cured composites. For example, the powdered form of the concentrate allows maximum loading of silicate in the final cured nanocomposite. But if a low silicate loading is desired, it is more convenient to form the cured composite from the concentrate in liquid form.

The powdered, gel-like or suspension forms of the inorganic particulate concentrates all are useful for forming cured polymer-inorganic nanolayer hybrid composites. The powdered forms are higher in inorganic content and can be used to form cured polymer-nanolayer hybrid composites with proportionately higher final reinforcement properties. The gel and suspension forms of the particular concentrates are convenient for forming nanolayer composites with lower inorganic content for use as coatings and films.

The cured polymer composites of this invention are distinguishable from composites made from alkylammonium exchange forms of 2:1 layered silicates in three important ways: (1) the initial silicate lacks alkylammonium exchange ions that can interfere with favorable binding interaction between the polymer and the silicate surface and (2) the composites exhibit tensile strength and modulus substantially better than composites made from alkylammonium exchanged clays and (3) the hybrid composites prepared from proton exchanged 2:1 layered silicates are more resistant to swelling by organic solvents.

The separation between the inorganic nanolayers in the cured polymer composites can be ordered or disordered with regard to their ability to exhibit X-ray diffraction patterns. If the nanolayer separation is ordered (FIG. 1B) with a regular separation between layers, one or more 001 Bragg XRD reflection is observed. If the nanolayer separation is disordered (FIG. 1C), i.e., highly variable, then the Bragg scattering is very broad, and in most cases are unobservable by routine XRD techniques. In general, the cured polymer-nanolayer hybrid composites of the present invention are of the disordered type.

The nanocomposite compositions of this invention are resistant to swelling and degradation by organic solvents. Pristine cured polymers and conventional composite are readily swollen upon submersion in organic aromatic and aliphatic solvents, like toluene and hexane. Upon evaporation of the solvent the polymer matrix disintegrates and forms cracks and crevices that greatly weaken the material. However, the cured polymer-inorganic nanolayer hybrid composites of the present invention typically resist swelling by organic solvents and are restored to their original form upon the evaporation of solvents.

Epoxy Resins

Epoxy resins are especially suitable for illustrating the general teachings and versatility of this invention in providing for useful hybrid nanocomposite compositions and merit special description as provided below.

The epoxy resins are well known to those skilled in the art and are described in Kirk-Othmer, John Wiley & Sons, 9 267–290 (1980). They are available from a variety of commercial sources including Shell Co., Ciba, and The Dow Chemical.

Bisphenol A type EPON-828 (Shell Co., Houston, Tex.), is an epoxy resin precursor with the bisphenol A structure and a molecular weight of 380, and has the formula:

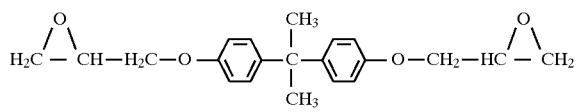

Bisphenol-A type, DER 331 (Dow Chemical Co., Midland, Mich.), is an epoxy polymer precursor and is an analog to Epon-828 having the formula:

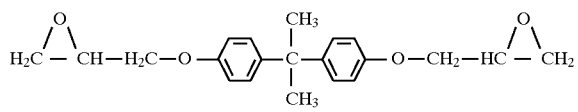

Bisphenol-F type, DER 354 (Dow Chemical Co.) is an epoxy polymer precursor having the formula:

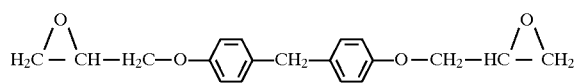

Novolac type, DER 435, DER 438 and DER 439 (Dow Chemical Co.) are epoxy polymer precursors having the formula:

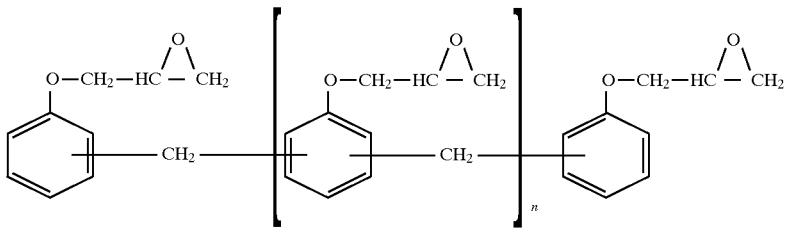

wherein n is between about 0.2 and 1.8.

Epoxy polymer, DER 732 (Dow Chemical Co.) is an epoxy resin precursor of the general formula:

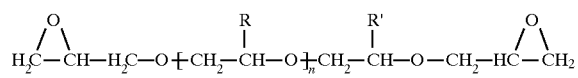

Epoxypropoxypropyl terminated polydimethylsiloxanes:

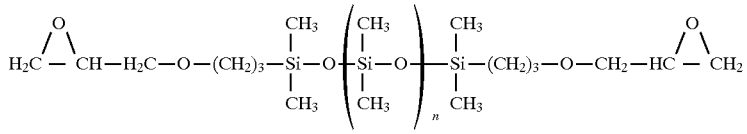

There are numerous other types of epoxy polymer precursors which are suitable and which are well known to those skilled in the art.

Epoxy Curing Agents

Amine curing agents are used to cure the epoxy resin precursors into an epoxy resin. The most preferred curing agents are polyoxypropylene di- or triamines which are sold as JEFFAMINE, Huntsman Chemical Company, Austin, Tex. Most preferred are the polyoxypropylene diamines (D-series) of the formula:

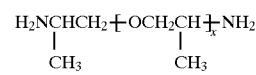

wherein x is between about 4 and 40.

The preferred diamines when used as curing agents for the epoxy resin precursors produce a glass transition temperature of less than ambient temperatures (25° C.) and preferably less than 0° C. As a result, when cured to a pristine epoxy resin without any filler, the resins are flexible when x is between about 4 and 40 in the polyoxypropylene diamine, the cured epoxy resin is also elastic.

The T series JEFFAMINE can be used. These are

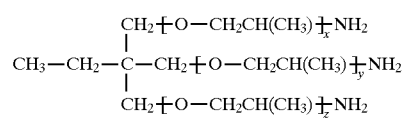

wherein x+y+z between about 4 and 120.

Various other epoxy resin curing agents, such as anhydrides and amides, can be used, so long as they do not interfere with the curing action of the primary ammonium cations in the clay. The amide curing agents are for instance

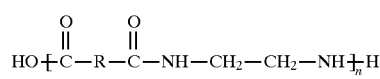

where n is between about 5 and 15.

Aminopropyl terminated polydimethylsiloxanes are suitable to crosslink epoxypropoxypropyl terminated polydimethylsiloxanes to make silicone rubber.

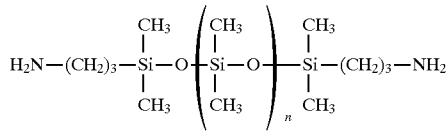

The final composite may be prepared from a single curing agent composition or from a multiple curing agent composition. The concentrate contains polymer precursors that are same as or different from those cured for preparing the final nanocomposite compositions.

When the polymer matrices in the hybrid nanocomposites of the present invention are flexible, they are very strong in comparison to the pristine polymer. The flexible composites of the present invention are particularly useful as sealants and flexible adhesives. They are strong, exhibiting a relatively high tensile strength. The compositions of the present invention can be used for: surface coatings, particularly decorative coatings; protective coatings; casting and encapsulation; construction, particularly seamless floors, sand-filled flooring, decorative aggregate, polymer concrete, trowel coatings, and wood consolidation; reinforced composites, particularly for propeller and impeller blades, boats, filament-wound tanks and piping; and adhesives. Other uses where a relatively thin flexible layer is needed are for instance in the dampening of interfaces between vibrating surfaces.

The polymer polymerizing component-layered inorganic ion exchange concentrate compositions described in this invention can be processed by already developed composite fabrication techniques, including casting and injection methods. For slow curing thermoset systems, e.g., epoxy and polysiloxane, several cast molding methods are very convenient; and for fast curing thermoset systems, e.g., alkyd and polyurethane, injection transferring method are suitable. The hybrid nanocomposites described in this invention not only can be used as end-use materials, but also, can be used as polymer matrix for fiber-reinforced composite materials. Further introduction of various fibers to the silicate nanolayer-reinforced polymer matrices will provide multi-component composite materials.

EXAMPLE E1

In this comparative example, a pristine epoxy polymer with a sub-ambient glass transition temperature (−40° C.) was prepared by crosslinking Epon-828 epoxy resin (Shell) and JEFFAMINE D2000 (Huntsman Chemicals, Austin, Tex.) polyetheramine curing agent. Equivalent amounts of the epoxide resin (27.5 wt %) and the polyetheramine (72.5 wt %) were mixed at 75° C. for 30 minutes. The epoxide-amine complex was then outgassed in vacuum for 10 minutes and transferred into an aluminum mold for curing at 75° C. for 3 hours and then at 125° C. for an additional 3 hours. The pristine epoxy matrix was denoted E1. E1 has tensile strength of 0.60 MPa and tensile modulus of 2.8 MPa.

EXAMPLE E2

In this comparative example, a conventional smectite clay-epoxy composite (E2) was prepared from naturally occurring $Na^+$-montmorillonite from Wyoming. The $Na^+$-montmorillonite was purified by sedimentation to remove quartz and other dense, large grain contaminants. Equivalent amounts of the Epon 828 epoxide resin (27.5 wt %) and the Jeffamine D2000 polyetheramine (72.5 wt %) were mixed at 75° C. for 30 minutes. To the resulting mixture was added 10 wt % clay, and the mixture was stirred for another 30 minutes. The clay-epoxide-amine complex was then outgassed in vacuum for 10 minutes and transferred into an aluminum mold for curing at 75° C. for 3 hours and then at 125° C. for an additional 3 hours. E2 is a conventional phase-segregated composite. Values of the tensile strength and modulus of the composite were 1.2 and 3.5 MPa, respectively. XRD analysis showed that the clay retained its original basal spacing of 14 Å after composite formation. There was no observable intercalation of the clay by the curing agent and epoxy resin.

EXAMPLE E3

Proton exchanged smectite clays were prepared by three methods. (1) Proton exchange reaction. A 2.0 g quantity of purified $Na^+$-montmorillonite was dispersed into a 1 litter of 0.001N HCl solution for ion exchange reaction. The reaction was carried out at 60° C. for 4 h. The reaction product was centrifuged and washed with deionized water until free of Cl ions and air-dried. The air-dried clay has a basal spacing of 10.5 Å. (2) Ion exchanged resin method. A 2.0 g quantity of purified $Na^+$-montmorillonite was dispersed into 200 mL of deionized water. A 2.0 g quantity of Dowex50WX8-100 $H^+$-exchanged resin was added to the montmorillonite suspension and stirred for 2 h. The resin was removed by decantation. The clay suspension was dried in air. The final clay has a basal spacing of 10.5 Å. (3) Thermodecomposition of $NH_4^+$-montmorillonite. 2 g of purified $Na^+$-montmorillonite was added to a 500 mL 0.1N $NH_4Cl$ solution for $NH_4^+$ ion exchange reaction. The pure $NH_4^+$-montmorillonite was obtained by subsequent washing and drying. The pure $NH_4^+$-montmorillonite has a basal spacing of 14 Å. $NH_4^+$-montmorillonite was heated in a oven at 300° C. for 4 h, and the final clay was a proton exchanged montmorillonite with a basal spacing of 10.5 Å. Therefore, the proton exchanged montmorillonite clays prepared from different methods have the same basal spacings. The proton exchanged montmorillonite clays from the said three methods were identical and were used equally in the following examples without any different results.

EXAMPLE E4

A conventional smectite clay-epoxy composite (E4) was prepared from proton exchanged montmorillonite (example E3). Equivalent amounts of the Epon 828 epoxide resin (27.5 wt %) and the Jeffamine D2000 polyetheramine (72.5 wt %) were mixed at 75° C. for 30 minutes. 10 wt % of proton exchanged montmorillonite was added to the epoxy-amine mixture and stirred for another 30 min. The clay-epoxide-amine mixture was then outgassed in vacuum for 10 minutes and transferred into an aluminum mold for curing at 75° C. for 3 hours and then at 125° C. for an additional 3 hours. XRD indicated that the resulting product (E4) is a conventional phase-segregated composite. The tensile strength and modulus of the composite were measured by use of an Instron gauge to be 1.1 and 3.6 MPa, respectively.

EXAMPLE E5

Figure 2:
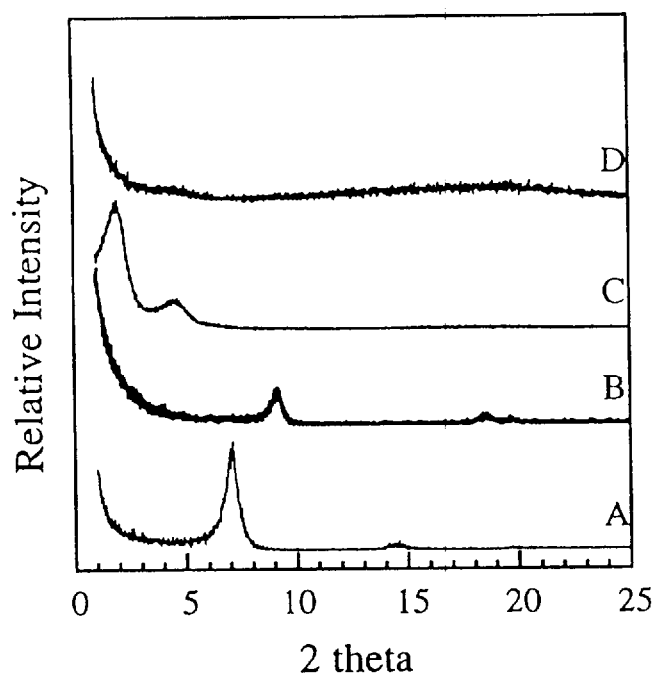
FIG. 2 shows powder X-ray diffraction patterns of (A) pristine $Na^+$-montmorillonite, $d_{001}$=13.2 Å; (B) $H^+$-montmorillonite, $d_{001}$=10.5 Å; (C) JEFFAMINE D2000 (Huntsman Chemical, Houston, Tex.)-$H^+$-montmorillonite particulate concentrate, $d_{001}$=45 Å; (D) Cured epoxy-exfoliated clay nanocomposite prepared from the JEFFAMINE D2000-$H^+$-montmorillonite intercalate concentrate and a mixture of Epon 828 resin and additional curing agent in stoichiometric amount.

This example illustrates the preparation of a powdered epoxy curing agent (precursor)-$H^+$-montmorillonite concentrate and its use in the preparation of epoxy polymer-exfoliated silicate nanocomposite. The epoxy polymer curing agent (precursor) was the polyetheramine, JEFFAMINE D2000. A 2.0 g quantity of H$^+$-montmorillonite ($d_{001}$=10.5 Å) was dispersed into 500 mL water, and the suspension was stirred vigorously. JEFFAMINE D2000 (10.0 g) was added to the H$^+$-montmorillonite suspension together with a small amount of ethanol (50 mL). The mixture was stirred at room temperature for 6 hr, and then centrifuged to isolate the solid intercalate concentrate. The concentrate was washed several times with EtOH/H$_2$O (1:1 by vol.) and air dried. The XRD pattern of the white powder (FIG. 2, curve C) indicated that the clay had a basal spacing of 46 Å. The substantial increase in the basal spacing indicated that the intercalation of the curing agent has been achieved. Thermal gravimetric analysis (TGA) indicated that the concentrate contained 55 wt % of silicate and 45 wt % of polymer precursor.

The powdered intercalate concentrate was prepared by solid blending method. A 100.0 g quantity of H$^+$-montmorillonite was placed in a Waring Commercial Blender, 40.0 g of Jeffamine was added dropwisely to the blended with the motor running at high speed. Final powdered form had a basal spacing around 36 Å, indicating the intercalation of the polyetheramine into the galleries of the proton exchanged layered silicate.

Figure 3A:
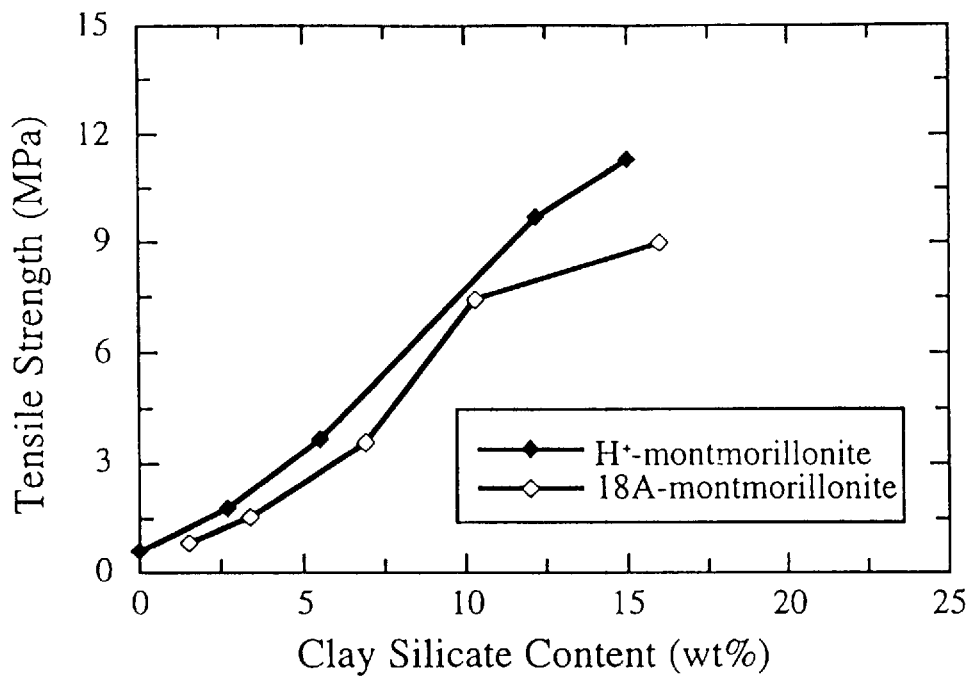
FIGS. 3A and 3B are graphs showing a comparison of tensile properties of the cured epoxy polymer-exfoliated clay hybrid nanocomposites prepared from a curing agent-$H^+$-montmorillonite intercalate concentrate and from alkylammonium exchange 18A-montmorillonite, where 18A represents the $C_{18}H_{37}NH_3^+$ cation.
Figure 3B:
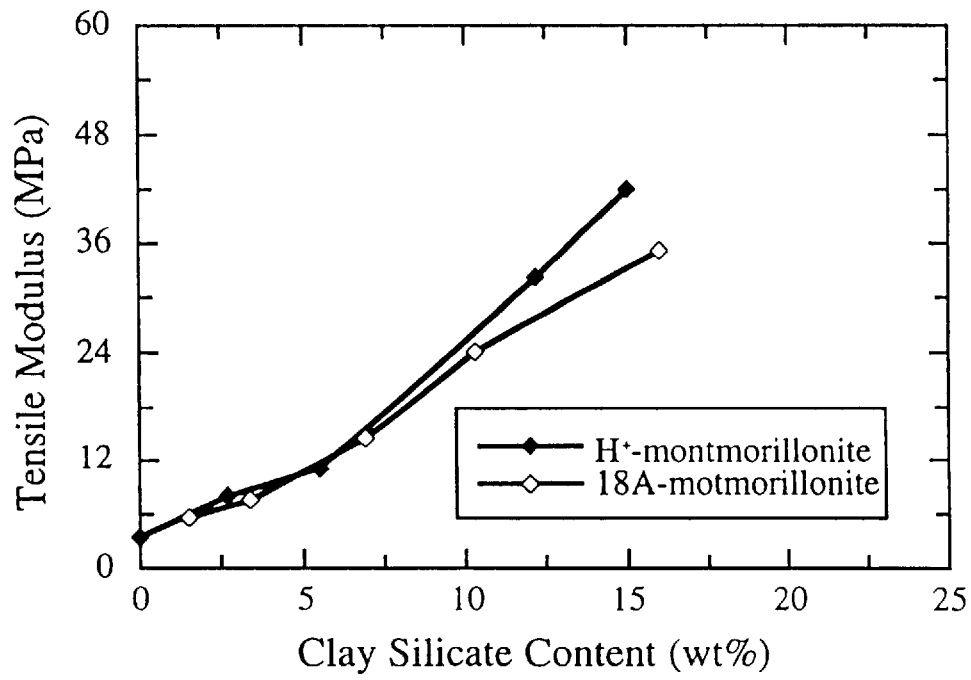

A cured epoxy polymer-silicate hybrid nanocomposite (denoted E5) was prepared from the above clay-curing agent concentrate as follows: A 1.0 g quantity of the white concentrate was mixed with 2.87 g Epon 828 epoxy resin and 7.12 g D2000 curing agent at room temperature for 15 min. The mixture then was transferred to an aluminum mold for curing at 75° C. for 3 h, followed by additional curing at 125° C. The final composite had a silicate content of 5 wt %. The XRD pattern (FIG. 2, curve D) showed the absence of clay Bragg diffraction peak (above 45 Å), indicating the composite was an exfoliated clay nanocomposite. A series of such epoxy polymer-clay nanocomposites with different silicate loadings were prepared and the tensile properties were measured. The results are plotted in FIGS. 3A and 3B. For comparison, the tensile strength and modulus of the an epoxy-clay nanocomposite prepared from the same curing agent and epoxy resin, but using montmorillonite exchanged with C$_{18}$H$_{37}$NH$_3^+$ alkylammonium ions in place of H$^+$-montmorillonite according to prior art (Lan, T. and Pinnavaia, T. J., Chem. Mater. 6 2216 (1994)) is included for comparison. It is clear that the presence of the alkylammonium in the clay gallery decreased the effectiveness of the clay reinforcement. The composite prepared from the curing agent-protonated clay concentrate was superior in mechanical strength. The intercalate concentrate prepared from the solid blending reaction was used to prepare the cured nanocomposite and had similar properties as E5.

EXAMPLE E6

This example illustrates the preparation of a liquid or gel form of epoxy curing agent (precursor)-H$^+$-montmorillonite concentrate and its use in the preparation of epoxy polymer-exfoliated silicate nanocomposite. The curing agent was a polyetheramine, namely JEFFAMINE D2000. A 2.0 g quantity of H$^+$-montmorillonite ($d_{001}$=10.5 Å) was dispersed in 200 mL water and stirred vigorously. An 8.0 g quantity of JEFFAMINE D2000 was added to the H$^+$-montmorillonite suspension containing a small amount of ethanol (40 mL). The mixture was stirred at 75° C. for 6 hr, and then the temperature was raised to the mixture's boiling temperature of the solvent and kept at the boiling until most of the solvent (H$_2$O/EtOH) evaporated. Finally, the mixture was placed under vacuum at 100° C. to remove all the solvent. A thick gel concentrate containing 20 wt % of silicate was obtained. An XRD pattern was obtained by placing a thin layer of gel on a glass plate. The basal spacing was 45 Å. This indicated that the amount of curing agent contained between the clay layers was the same as in Example E4 and that the excess D2000 was contained between the clay tactoids to form the gel.

A 2.5 g quantity of the gel form concentrate was mixed with 2.61 g Epon 828 and 4.89 g D2000 curing agent. Then the mixture was transferred to an aluminum mold for curing at 75° C. for 3 h and then at 125° C. for an additional 3 h. The final composite contained 5 wt % clay content. The XRD pattern (which was similar to FIG. 2, curve D) showed the absence of clay Bragg diffraction. Thus, the composite was an exfoliated clay nanocomposite. The tensile strength and modulus were indistinguishable within experimental uncertainty from the composite prepared at the same clay loading from the powdered form of the concentrate as described in Example E5.

EXAMPLES E7–E12

Curing agents JEFFAMINE D230, D400, D4000, T304, T3000, and T5000 were used to prepare the corresponding curing agent-intercalated H$^+$-montmorillonite intercalate concentrate in powdered and gel forms. cured epoxy-clay hybrid nanocomposites. The procedure was similar to the procedure described in Examples 5 and 6. Due to the differences in size of these curing agent molecules, the final curing agent intercalated clays had different basal spacings (Table 3). The initial H$^+$-montmorillonite in air-dried form had a basal spacing of 10.5 Å.

TABLE 3

Basal Spacings (Å) of Different Polyetheramine-H$^+$-montmorillonite Intercalate Concentrate Compositions in Powdered and Gel Forms.

| Curing agent | Powdered Form | Gel Form |
| --- | --- | --- |
| E7, D230 | 15.8 | 15.9 |
| E8, D400 | 18.6 | 18.8 |
| E5, D2000 | 45.5 | 44.9 |
| E9, D4000 | 89.9 | 92.1 |
| E10, T304 | 16.8 | 17.2 |
| E11, T3000 | 62.5 | 64.3 |
| E12, T5000 | 95.7 | 97.8 |

The results in Table 3 indicated that the basal spacing for the intercalated clay in dependent on the size of the guest molecules and independent on the presence of the excess polyetheramine. Cured epoxy-clay hybrid nanocomposites were prepared by using clay concentrates E7 to E12 (powder or gel form). They all formed exfoliated clay nanocomposites as judged by XRD. Cured epoxy-smectite clay hybrid nanocomposites E7, E8 and E10 were glassy at room temperature. They showed greatly improved tensile modulus. Nanocomposites E9, E11 and E12 are flexible and they exhibited greatly improved tensile strength and modulus in agreement with the results obtained in Example E5.

EXAMPLE E13

The example illustrates that polyamide curing agents, such as HENKEL VERSAMID series, were useful to prepare curing agent-H$^+$-montmorillonite intercalate concentrates and hybrid nanocomposites. A 1.0 g quantity of H$^+$-montmorillonite ($d_{001}$=10.5 Å) was dispersed in 100 mL water, and the mixture was stirred vigorously. VERSAMID-125 (10.0 g) was dissolved in 200 mL EtOH and 100.0 g H$_2$O was added slowly to the Versamid EtOH solution. The clay suspension in water then was added to the Versamid solution and stirred vigorously. After stirring for a period of 6 hr, the solid concentrate was removed from the solvent by centrifuging. The final product was washed with EtOH/H$_2$O (1:1 by vol.) several times and air dried. XRD result indicated that the clay exhibited first and second order diffraction peaks at 50 Å (001) and 25 Å (002), corresponding to a basal spacing of 50 Å. The significant increase in the clay basal spacing from an initial value of 10.5 Å indicated that the intercalation of the Versamid curing agent had been achieved. Thermal gravimetric analysis (TGA) result indicated that the composition of the powdered Versamid-140-H$^+$-montmorillonite intercalate concentrate contained 50 wt % of clay and 50 wt % of Versamid-125.

A cured epoxy-clay nanocomposite (E13) was prepared from the powdered concentrate as follows: 1.0 g of the concentrate was mixed with 6.04 g Epon 828 epoxy resin and 2.96 g Versamid-125 curing agent at room temperature for 15 min. Then, the mixture was transferred to an aluminum mold for curing at 75° C. for 3 h and then at 125° C. for an additional 3 h. The final composite contained 5 wt % silicate. XRD pattern showed the absence of clay Bragg diffraction peak, signifying that the cured hybrid contained exfoliated clay nanolayers. The improvement in the mechanical properties of the cured nanocomposites relative to the pristine polymer formed form Epon-828 and Versamid curing agent was comparable to that obtained for the cured Epon-828-D2000 composite containing the same montmorillonite loading.

EXAMPLE E14

VERSAMID 140 polyamide, with higher molecular weight than VERSAMID 125, also was used to prepare a curing agent-H$^+$-montmorillonite intercalate and a cured epoxy-clay hybrid nanocomposite (E14) using methods analogous to those described in Example E13. The intercalate concentrate had a basal spacing of 68 Å and the cured composite was an exfoliated clay nanocomposite, with tensile properties superior to the pristine cured polymer.

EXAMPLES E15–E19

Proton exchange forms of 2:1 layered silicate minerals, including beidellite, hectorite, montmorillonite, nontronite, rectorite, saponite, vermiculite and synthetic 2:1 layered silicate including: fluorohectorite, laponite, taeniolite and tetrasilicic mica were used to prepare powdered and gel forms of amine curing agent-layered silicate intercalate concentrates and the corresponding cured epoxy-layered silicate hybrid nanocomposites. The experimental methods were the same as that described in Examples E5 and E6. These layered silicates had representative layer charge densities in the range 0.6–2.0 electron charge under per O$_{20}$ unit, corresponding to the cation exchange capacities given in Table 4. The higher the layer charge density, the more protons in the gallery. Therefore, the amount of curing agent adsorbed into the layered silicate galleries increased with layered silicate charge. XRD data for the intercalate concentrates formed from Jeffamine D2000 and hectorite (E15), Wyoming-montmorillonite (E5), Arizona-montmorillonite (E16), fluorohectorite (E17), vermiculite (E18), and rectorite (E19) are given in Table 4. All of the corresponding cured epoxy polymer-2:1 layered silicate hybrid nanocomposites showed superior tensile properties relative to the pristine polymer formed from EPON 828 and JEFFAMINE D2000.

TABLE 4

JEFFAMINE D2000-2:1 Layered Silicate
Intercalate Concentrates In Powdered and Gel Form.

| 2:1 Layered Silicate | Ion Exchange Capacity (meq/100 g) | d001, Å Initial H$^+$-Silicate | d001, Å, Powdered Concentrate | d001, Å, Gel Concentrate* |
|---|---|---|---|---|
| E15, hectorite | 62 | 10.4 | 35.9 | 35.8 |
| E5, montmorillonite-Wy | 90 | 10.5 | 45.5 | 44.9 |
| E16, montmorillonite-Az | 118 | 10.5 | 52.2 | 52.9 |
| E17, fluorohectorite | 140 | 10.6 | 55.9 | 54.8 |
| E18, vermiculite | 168 | 10.7 | 65.2 | 66.4 |
| E19, rectorite | 120* | 21.4 | 63.6 | 64.9 |

*The clay loading was 10 wt % in the gel form intercalate concentrated.

EXAMPLES E20–E24

Epoxy-clay hybrid nanocomposites were prepared by using epoxy resins from DOW Chemical Co., JEFFAMINE D2000, and a curing agent-layered silicate intercalate concentrate containing JEFFAMINE D2000 and H$^+$-montmorillonite. The experimental methods were analogous to those described in Example E5 and E6. The DOW epoxy resins used to form cured hybrid nanocomposites were the Bisphenol-A type DER 331, E20; bisphenol-F type, DER 354, E21; Novolac type, DEN 438, E22; and flexible epoxy resin, DER 732, E23. Epoxypropoxypropyl terminated polydimethylsiloxanes was also used to prepare epoxy-crosslinked polysiloxane by using aminopropyl terminated polydimethylsiloxanes as the crosslinking agent. The intercalated concentrate was prepared with H$^+$-montmorillonite with the reaction with the aminopropyl terminated polydimethylsiloxanes (E24).

The epoxy-clay nanocomposites prepared from the said epoxy resins, curing agents, and curing agent-H$^+$-montmorillonite intercalate concentrate had exfoliated clay structures. Their mechanical properties were superior to the corresponding pristine cured polymer networks and comparable to the results obtained for the analogous Epon 828-D2000-clay nanocomposite materials of Examples E1 to E5.

EXAMPLE E25

This example illustrates the swelling resistance of polymer-layered silicate hybrid nanocomposite. Solvent absorption data for the hybrid composites E1, E2, and E5 were obtained using a mass differential technique. Hybrid nanocomposite samples of a known weight were immersed in toluene at room temperature and re-weighed periodically after blotting to remove excess solvent. The difference between the two weights corresponded to the toluene uptake. Samples were weighted until a constant uptake of toluene had been achieved, at which point it was assumed that they had reached equilibrium. The relative rate of toluene adsorption and total uptake are listed in Table 5.

TABLE 5

Relative Toluene Absorption Rate and Total Toluene Uptake for Cured Epoxy-Layered Silicate Hybrid Nanocomposites Prepared from Epon 828 and Jeffamine D2000 Curing Agent.

| Example[a] | Composite Type | Relative Adsorption Rate (%) | Relative Total Uptake (%) |
|---|---|---|---|
| E1 | Pristine polymer | 100 | 100 |
| E2 | conventional | 95 | 100 |
| 18A-mont[b] | exfoliated | 42 | 51 |
| E5 | exfoliated | 34 | 38 |

[a]E2, E5 and 18A-mont composites contained 5 wt % silicate loading.
[b]Octadecylammonium montmorillonite The exfoliated epoxy-clay nanocomposite E5 exhibited a substantial decrease in toluene uptake. The exfoliated 10 Å-thick clay layer in the matrix may contributed to the decrease in the rate and amount of solvent uptake. In contrast, for the conventional composite (E2), where the clay exists as unexfoliated tactoids, the effect of the clay in decreasing solvent adsorption was less significant. The reduction of toluene adsorption of E5 compared to the nanocomposite containing the same loading of octadecylammonium montmorillonite emphasizes the improvement possible by forming polymer-clay hybrid nanocomposites in the absence of alkylammonium ions. Similar swelling experiments with hexane as the solvent were carried out and comparable results were obtained.

The adsorbed organic molecules were removed by air-drying or vacuum-drying. During the drying process, the pristine polymer matrix (E1), conventional composite (E2), cracked, and become cloudy, whereas, the exfoliated clay nanocomposite (E5) retained its integrity and was restored to its original size and shape upon evaporation of the solvent. Therefore, for the exfoliated layered silicate nanocomposite, the adsorption-desorption of organic molecules occurs with structural reversibility. The ability of the nanocomposite to return to its pristine structural state upon evaporation of the dissolved organic solvent greatly extends the use of these materials as sealants and gaskets that can contact organic substances frequently.

EXAMPLE E26

This example illustrates the benefit in adhesion properties provided by thermoset polymer-layered silicate hybrid nanocomposite. Adhesion tests were performed according to the ASTM D1002-72 standard test method for the strength properties of adhesives in shear by tension loading (metal-to-metal) by using aluminum plates. The maximum force to break the adhesion between two aluminum plates was recorded and used to evaluated the performance of different composites. The relative adhesive strength of Examples E1, E2, and E5 are listed in Table 6. Taking the adhesive force for the pristine polymer E1 as 100%, the relative adhesion force was obtained for samples E2, E5, and 18A-mont as the adhesive materials between the two plates.

TABLE 6

Relative Force Required to Break Adhesive Bond Between Aluminum-Aluminum Plates.

| Nanocomposites Example | Type of Clay Composite | Relative Adhesive Strength (%) |
|---|---|---|
| E1 | pristine polymer | 100 |
| E2 | conventional | 67 |
| 18A-mont | exfoliated | 450 |
| E5 | exfoliated | 730 |

*Contact area = 1 in$^2$,

The E2, E5 and 18A-mont composites contained 5 wt % silicate loading.

The strong adhesion strength provided by the exfoliated nanocomposite E5 indicated the advantages of alkylammonium ion free nanocomposite for adhesive applications. Also, they can be used as sealants in construction and electrical insulation applications.

EXAMPLE E27

This example illustrates that the thermoset polymer precursor epoxy resin can be used to prepare layered silicate intercalate concentrates and use of them to prepare exfoliated polymer-layered silicate hybrid nanocomposites. A 2.0 g quantity of Epon 828 epoxy resin was mixed with a 400 mL of H$^+$-montmorillonite (1.0 wt %) water suspension (10 vol % acetone). The mixture was stirred at room temperature for 24 h and the clay was washed with water and air dried. The resulting powdered epoxy-clay intercalated had a basal spacing of 22 Å, indication the intercalation of the epoxy resin into the silicate gallery. Thermal gravity analysis (TGA) result indicate the intercalate contained 25 wt % of epoxy and 75 wt % of layered silicate.

The epoxy-H$^+$-montmorillonite intercalate concentrate was used to prepared cured epoxy polymer nanocomposite (E27). A 2.0 g quantity of the said epoxy-H$^+$-montmorillonite intercalate concentrate was added to a mixture of Epon 828, 7.34 g and Jeffamine D2000, 20.88 g. The composite preparation was the same as described in Example E5. XRD result show E27 was an exfoliated nanocomposite. The tensile, solvent resistance, and adhesion properties of the resulting hybrid nanocomposite were comparable with E5.

EXAMPLE E28

A polyether-layered silicate hybrid nanocomposite was prepared by reaction of an epoxy resin-H$^+$ montmorillonite particulate concentrate with excess resin under conditions where the resin undergoes self-polymerization.

A 2.0 g quantity of the epoxy-H$^+$-montmorillonite intercalate of Example 27 was added to 13.0 g of Epon 828 and the mixture was heated gradually to near 205° C. The epoxy resin monomer polymerized and the epoxy-H$^+$-montmorillonite intercalate exfoliated to form polyether-silicate composites. Similar polyether-silicate composite was obtained by reacting of 1.5 g H$^+$-montmorillonite with 13.5 g Epon 828 at 210° C.

It is intended that the foregoing description be only illustrative of the present invention and that the present invention be limited only by the hereinafter appended claims.

We claim:

1. A particulate composition used to prepare a cured polymer and layered inorganic composition composite which comprises:

a polymer polymerizing component which has been intercalated into the particles of a layered inorganic composition with nanolayers and with galleries between the nanolayers wherein:

(1) the layered inorganic composition has at least 10% of cation exchange sites occupied by protons as $H^+$ prior to being intercalated a remainder being occupied by inorganic ions other than the protons; and (2) the polymer polymerizing component contains at least one basic group for reaction with the protons of the layered inorganic composition, wherein in use of the particulate composition the nanolayers are separated by a polymer precursor or polymer melt which is introduced into the galleries of the inorganic layered composition and reacts with the polymer polymerizing component and wherein the weight ratio of the polymer polymerizing component to layered inorganic composition is between about 1:100 and 100:1.

2. The composition of claim 1 wherein the polymer polymerizing component is a monomer or oligomer for the polymer which produces the cured polymer.

3. The composition of claim 1 wherein the layered inorganic composition is selected from the group consisting of a crystalline sheet silicate, a phosphate, an arsenate, a titanate, a vanadate, a niobate, a molybdate, a uranyl compound and a manganate.

4. The composition of claim 1 wherein the polymer polymerizing component for reaction with the polymer precursor or polymer melt is selected from the group consisting of an amine, an amide, an anhydride, an epoxide, an isocyanate, alcohol and a vinyl polymerizing agent.

5. The composition of claim 1 wherein the basic group of the polymer polymerizing component is selected from the group consisting of an amine, an amide, an imide, an epoxide, a hydroxide, a pyridinyl, a pyrrolyl and a vinyl group.

6. The composition of claim 1 with the polymer precursor to be introduced into the galleries provides a cured thermoset polymer selected from the group consisting of an epoxy, a polyurethane, a polyurea, a alkyd, a polysiloxane, a polyester and a polyimide polymer.

7. The composition of claim 1 wherein the polymer precursor to be introduced into the galleries is selected from the group consisting of a diglycidyl ether of bisphenol A epoxide, a diglycidyl ether of bisphenol F epoxide, a Novolac epoxide, a diglycidyl polyalkyleneether epoxide, and a epoxypropoxypropyl terminated polydimethylsiloxane.

8. The composition of claim 1 wherein the polymer polymerizing component is selected from the group consisting of a polyoxypropylene diamine, a polyoxypropylene triamine, a polyamide, and a aminopropyl terminated polydimethysiloxane which provides crosslinking and curing of an epoxy resin and wherein the polymer precursor is an epoxy resin.

9. The composition of claim 1 in which the particles have an average diameter between about 20 and 20,000 nm.

10. The composition of claim 1 wherein the $H^+$ is provided in the layered inorganic composition by reaction with an acid.

11. The composition of claim 1 wherein the $H^+$ is provided in the inorganic layered inorganic composition by a proton exchange reaction with a protonated cationic exchange resin.

12. The composition of claim 1 wherein the $H^+$ is provided in the layered inorganic composition by thermal conversion of an ammonium form of the layered inorganic composition.

13. The composition of any one of claims 1, 10, 11 or 12, wherein the polymer polymerizing component is selected from the group consisting of an amine and an amide for polymerizing an epoxy resin.

14. A particulate composition used to prepare a cured polymer and 2:1 layered silicate hybrid composite which comprises:

a polymer polymerizing component which has been intercalated into particles of a 2:1 layered silicate with nanolayers and with galleries between the nanolayers wherein:

(i) the 2:1 layered inorganic silicate has cation exchange sites occupied by protons as $H^+$ a remainder being occupied by inorganic ions other than the protons; and (ii) the polymer polymerizing component for the polymer precursor contains at least one basic group for reaction with the protons of the layered silicate, wherein in use of the particulate composition the nanolayers are separated by a polymer precursor or polymer melt which is introduced into the galleries of the 2:1 layered silicate wherein the weight ratio of the polymer polymerizing component to the 2:1 layered silicate is in the range 1:100 to 100:1.

15. The composition of claim 14 wherein the polymer polymerizing component and the polymer precursor form a thermoset cured polymer.

16. The composition of claim 14 wherein the polymer polymerizing component and the polymer precursor or polymer melt form a thermoplastic polymer.

17. The composition of claim 16 wherein the thermoplastic polymer is selected from the group consisting of a polyamide, a protein, a polyester, a polyether, a polyurethane, a polysiloxane, a phenol-formaldehyde, a urea-formaldehyde, a melamine-formaldehyde, a cellulose, a polysulfide, a polyacetal, a polyethylene oxide, a polycaprolactam, a polycaprolactone, a polylactide, a polyimide, and a polyolefin.

18. The composition of claim 14 wherein the cation exchangeable 2:1 layered silicate is selected from the group consisting of a smectite clay, a synthetic smectite derivative, a mixed layered clay, a synthetic mixed layered clay, a vermiculite, a hydromica, a mica, a synthetic mica-like derivative and mixtures thereof.

19. The composition of claim 14 wherein the $H^+$ is provided in the 2:1 layered inorganic silicate by reaction with an acid.

20. The composition of claim 14 wherein the $H^+$ is provided in the 2:1 layered inorganic silicate with a proton exchange reaction with a protonated cationic exchange resin.

21. The composition of claim 14 wherein the $H^+$ is provided in the 2:1 layered inorganic silicate by thermal conversion of an ammonium form of the layered inorganic composition.

22. The composition of any one of claims 14, 19, 20 and 21, wherein the polymer polymerizing component is selected from the group consisting of an amine and an amide for polymerizing an epoxy resin.

* * * * *